Figure 1:
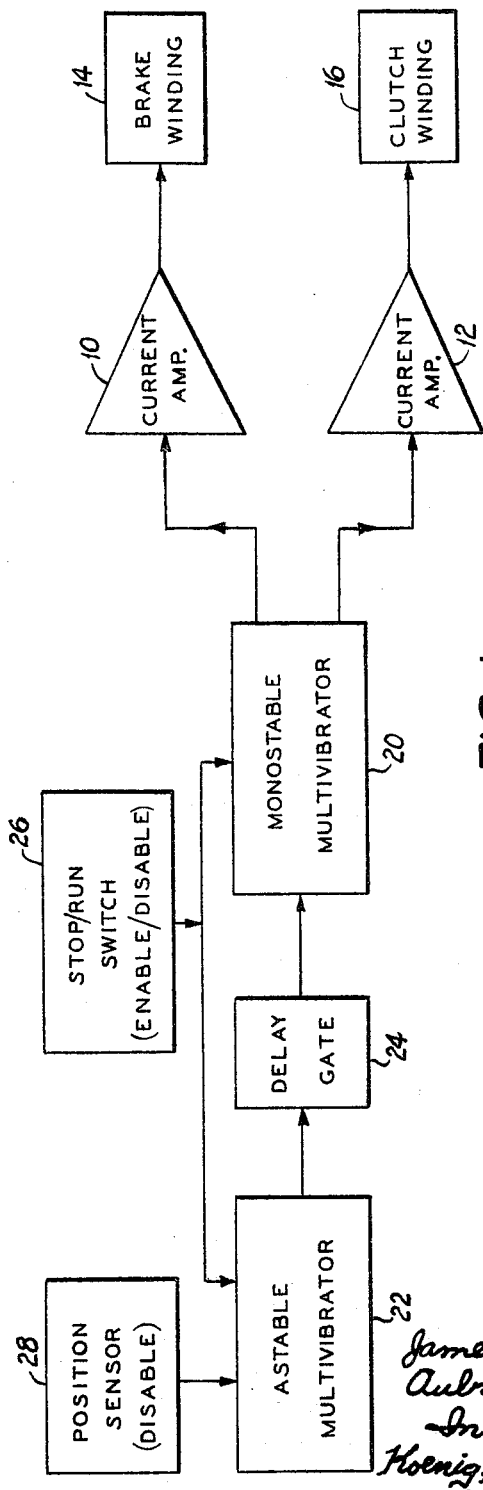

United States Patent Office 3,268,047
Patented August 23, 1966

3,268,047
POSITIONING CONTROL
James W. Grygera, Racine, and Aubrey H. Smith, Kenosha, Wis., assignors to Eaton Yale & Towne, Inc., a corporation of Ohio
Filed July 22, 1964, Ser. No. 384,327
18 Claims. (Cl. 192—144)

This invention relates to a positioning control, and more particularly to such a control for stopping, at a predetermined position, a rotatable member driven by a driving member through an electric clutch and braked by an electric brake.

Controls according to the present invention are applicable to a wide field of apparatus, such as sewing machines and machine tools. For the purpose of illustration this control will be described herein as used with commercial sewing machines.

In commercial sewing operations, it is most commonly desired that the machine stop with the needle in the down position so that the operator can then pivot the workpiece around the needle without displacing the workpiece from the last stitch taken. It is also desirable that the machine can selectively be caused to stop wtih the needle in the full-up position, so that the workpiece can be easily removed. It is important that the machine can be braked very quickly from full speed operation to a complete stop and that when positioning from a previous stop no more than one stitch need be taken. As will be easily understood, similar characteristics are desirable in a wide variety of machine operations in which it is desired that a component come to rest at a particular position or in a particular attitude.

Among the several objects of the invention may be noted the provision of a positioning control for a driven member whose speed is variably controlled by an electric brake and clutch; the provision of such a control which has exceptionally fast response and provides improved precision in positioning; the provision of such a control of the class described which employs highly reliable solid-state circuitry; the provision of a positioning control which will provide precise positioning at a variety of selectable positions, which will operate smoothly over a wide range of loads without adjustment, which is relatively inexpensive, and which is easily and inexpensively maintained. Other objects and features will be in part apparent and in part pointed out hereinafter.

Essentially the invention relates to a positioning control to be employed with a variable velocity drive in which a driven member is driven at a desired controllable velocity from a continuously rotating driving source, such as an A.C. motor, through an electric clutch and brake coupling. The positioning control includes means for actuating the clutch to rotate the driven member and means for actuating said brake to brake rotation of the driven member. This control also incorporates a switch having a first position in which the circuit energizes the clutch actuating means thereby to rotate the driven member at a desired speed, the switch having a second position in which the brake actuating means is energized by the circuit to brake the driven member. This circuit further includes means to deenergize the brake actuating means after a predetermined time interval and means for thereafter alternately and reptitively energizing the brake and clutch actuating means thereby to rotate the driven member at a reduced speed. Means are connected in this circuit for sensing a predetermined position of said driven member and energizing said brake actuating means whereby the driven member is brought to a stop at said predetermined position.

In a preferred embodiment the clutch and the brake are alternately energized by transistor current switching devices. Preferably, the position sensing means includes means for sensing a second predetermined position of the driven member and energizing the brake actuating means.

The invention accordingly comprises the control system hereinafter described, the scope of the invention being indicated in the following claims.

Figure 2:
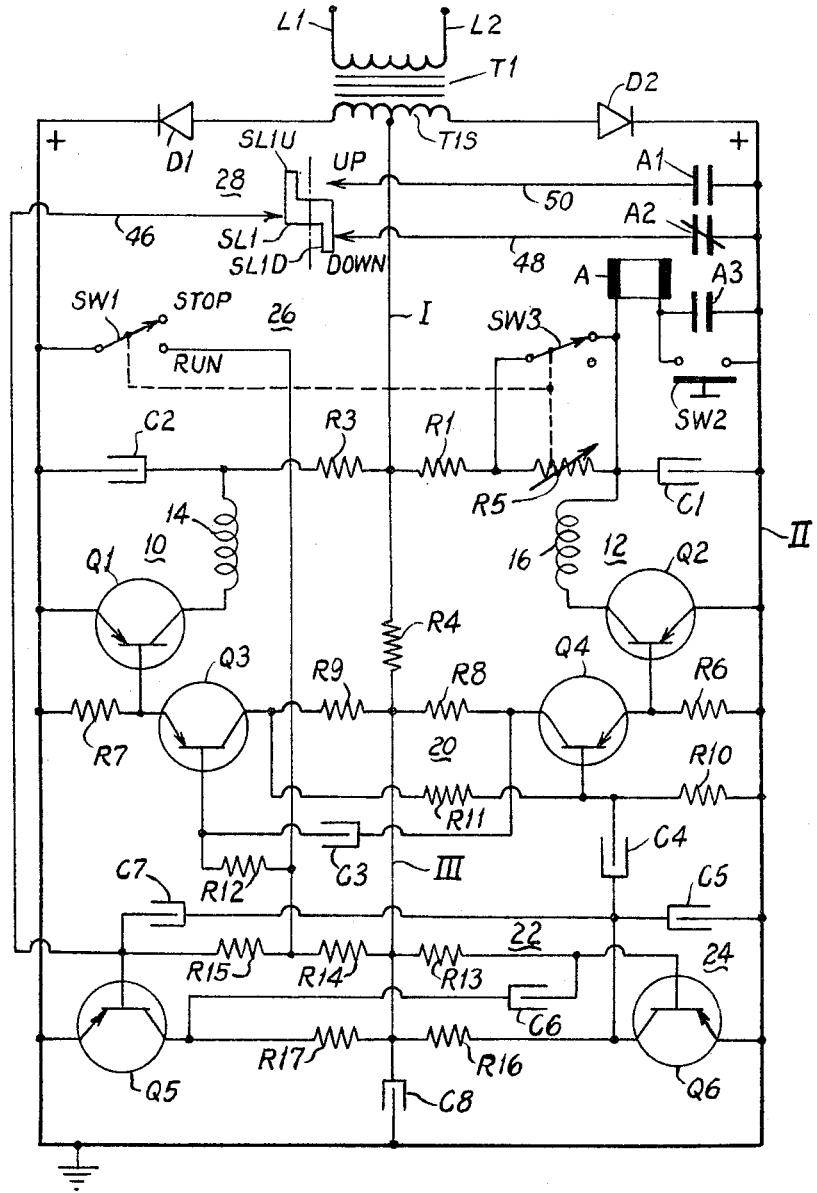

In the accompanying drawings in which one of various possible embodiments of the invention is illustrated, FIG. 1 is a block diagram illustrating the major components of this embodiment and their interconnection; and FIG. 2 is a schematic circuit diagram of the FIG. 1 system.

Corresponding reference characters indicate corresponding parts throughout the several views of the drawings.

Referring now to FIG. 1, a positioning control of the present invention is illustrated as including current amplifiers 10 and 12 for respectively energizing brake winding 14 and clutch winding 16 of a conventional electromagnetically actuated friction brake and clutch coupling, used for example in a commercial sewing machine drive, which includes the customary electric motor for driving the rotatable driven member or output shaft of the drive at a desired angular velocity, and braking the driven member. These current amplifiers are preferably semiconductor switching devices, such as transistors, operated in a switching mode so that only negligible power is dissipated in the amplifiers themselves.

Current amplifiers 10 and 12 are in turn controlled or switched between conducting and nonconducting modes by a monostable or one-shot multivibrator 20. It is a characteristic of this multivibrator to exhibit two sharply defined states, a first or stable state and a second state, and to normally remain in or revert to its first state. When multivibrator 20 is in its first state and is triggered or pulsed by a trigger signal of sufficient strength, it will assume its second state for a fixed or preselected period and then revert to its first or stable state. Multivibrator 20 is connected to the current amplifiers 10 and 12 so that the current amplifier 10 and hence the brake winding 14 are energized when multivibrator 20 is in its first or stable state and so that the current amplifier 12 and hence the clutch winding 16 are energized when multivibrator 20 is operating in its second state.

An astable or free-running multivibrator circuit 22 provides a source of pulses for triggering the one-shot multivibrator 20 and is connected to the multivibrator 20 through a timing network or a delay gate 24. Delay gate 24 operates to provide a predetermined time interval or delay between the time when free-running multivibrator 22 is first started until a trigger pulse or signal of sufficient amplitude to trigger multivibrator 20 into its second state is transmitted to multivibrator 20. Delay gate 24 does not delay any given pulse in time but only defers triggering multivibrator 20 until the pulses appearing at the gate output are of sufficient strength.

Multivibrators 20 and 22 are each under the control of a STOP-RUN switch 26. When switch 26 is in its RUN position both multivibrators are electrically disabled, multivibrator 20 being disabled in its said second state, i.e., with clutch winding 16 being energized.

Free-running multivibrator 22 is also responsive to a position sensor 28 which is operated in synchronism with the driven member. When the driven member arrives at a preselected angular position, sensor 22 electrically disables free-running multivibrator 22. When the free-running multivibrator 22 is disabled, no triggering pulse is provided to one-shot multivibrator 20 and it will immediately revert from its disabled second state to its first state, thereby causing current amplifier 10 to conduct and energize brake winding 14.

The basic operation of the positioning control can be understood from the simplified block diagram of FIG. 1. when the driven member or output shaft is to be rotated at any normal desired speed, the STOP-RUN switch 26 is positioned to RUN condition thereby disabling both free-running multivibrator 22 and the one-shot multivibrator 20, the latter being maintained in its second state with current amplifier 10 nonconducting and brake winding 14 deenergized, while current amplifier 12 is conducting and clutch winding 16 is accordingly energized.

When the driven member is to be stopped in a predetermined position, the STOP-RUN switch 26 is moved to STOP, thereby discontinuing the electrical disablement of both multivibrators 20 and 22. Multivibrator 20, according to its natural characteristic, immediately reverts to its first state in which current amplifier 10 is switched to its conductive state to energize brake winding 14. Thus, if the driven member has been running at full speed, it will be braked rapidly to a diminished speed.

The enablement of the free-running multivibrator 22 will cause a series of trigger pulse signals to be generated but they will not be passed on to the input of one-shot multivibrator 20 for a predetermined interval due to the operation of the delay gate 24. This interval is chosen to provide adequate time for the then energized brake to slow the driven member to a diminished speed which is within the response time of the positioning circuitry.

After the delay interval provided by the gate 24, the pulses from the free-running multivibrator 22 will be passed on to the one-shot multivibrator 20. Each such subsequent pulse will then cause the one-shot multivibrator 20 to assume its second state for its characteristic fixed or preselected period and then revert to its first state. Since a succession of pulses is provided by free-running multivibrator 22, the one-shot multivibrator 20 will thus repetitively alternate between the two states. Correspondingly, the clutch winding 16 and the brake winding 14 will be alternately energized. The respective energization time periods of the brake and clutch windings are chosen so that the driven member will be continuously rotated at an appropriate reduced speed from which a complete stop can be reliably and quickly made.

The driven member will rotate at this reduced speed until it reaches the desired or predetermined stopping position, at which time position sensor circuit 28 will disable astable multivibrator 22. When multivibrator 22 is disabled, the monostable multivibrator 20 will no longer be triggered and will therefore revert to its first state thereby causing current amplifier 10 to conduct and energize brake winding 14. The full energization of the brake winding 14 and the corresponding deenergization of the clutch winding 16 will cause the driven member to be quickly stopped from the reduced speed so as to come to rest at a predetermined position, e.g., a needle-down position of the sewing machine head.

A schematic circuit diagram of an exemplary FIG. 1 control system is shown in FIG. 2. Electric power, at a potential suitable for a transistorized control system, is obtained from conventional A.C. mains L1, L2 by a step-down transformer T1 having a center-tapped secondary winding T1S. The turns ratio may, for example, be such that the secondary winding T1S provides 25 volts R.M.S. on each side of the center tap. A pair of diodes D1 and D2 connected in a full-wave rectifier configuration are polarized so that pulsating direct current having a peak value of approximately −40 volts is available at the line I connected to the center tap. This potential is established relative to a positive bus II, illustrated as a heavier line, which is a common or ground bus. Filtered D.C., appropriate for supplying the one-shot multivibrator 20 and the free-running multivibrator 22, is provided at bus III by a filter network including the resistor R4 and the capacitor C8.

The brake control winding 14 is connected across the pulsating D.C. supply through the emitter-collector circuit of a power output transistor Q1 at one end and through a current limiting resistor R3 at the other end. An energy storage capacitor C2 bridges the transistor Q1 and the brake control winding 14.

The clutch winding 16 is connected across the pulsating D.C. supply through the emitter-collector circuit of power output transistor Q2 at one end and through serially connected resistances R1 and R5 at the other end. An energy storage capacitor C1 is shunt connected across the serially connected clutch winding 12 and the emitter-collector circuit of Q2. Resistor R1 is a current-limiting resistor similar to R3, while R5 is a rheostat for adjusting clutch current during running for speed control purposes. A normally closed switch SW3, connected in parallel with rheostat R5, is provided for effectively removing the speed control function during positioning operations. Switch SW3 is mechanically linked to the arm of R5 so as to open as soon as R5 resistance is decreased from its maximum. For example, R5 may be a foot-operated rheostat, which maintains maximum resistance in series with the clutch winding until the pedal is depressed whereupon switch SW3 is actuated to its open position from the closed condition illustrated. As rheostat R5 is further depressed, the resistance decreases toward a minimum value.

Transistors Q1 and Q2 are operated in a switching mode, i.e., they either are fully conductive (saturated) or are cut off. When one of the transistors Q1 or Q2 is turned OFF, corresponding energy storage capacitor C1 or C2 will charge to a voltage nearly equal to the voltage of the pulsating D.C. present at the bus I, i.e. about 40 volts. Accordingly, when either of the power output transistors is first turned on, the current through the corresponding control winding 14 or 16 is driven by the full peak potential appearing across the associated energy storage capacitor. After a momentary surge, however, the capacitor is appreciably discharged and the current through the control winding will be limited by the corresponding current-limiting resistor R1 or R3. In the embodiment illustrated, the values of the resistors R1 and R3 are chosen so that the steady-state voltage across a continuously energized control winding is about 6 volts.

The availability of stored energy means that when the control windings are first energized there will be an initial surge of current which will provide a "forcing" of the brake or clutch so that a very fast response time is obtained for positioning and starting. However, the steady-state currents through the control windings are sufficient for normal control.

The output transistors Q1 and Q2 are the principal components of the current amplifiers 10 and 12 respectively, and are controlled by monostable multivibrator 20 which incorporates transistors Q3 and Q4. The base of Q1 and the emitter of Q3 are commonly connected via a resistor R7 to ground, while a resistor R6 similarly interconnects the base of Q2 and the emitter of Q4 to ground. Resistors R9 and R8 provide appropriate loads for the collector circuits of transistors Q3 and Q4 respectively. A resistive voltage dividing network including the resistors R10 and R11 interconnects the collector of transistor Q3 to the base of transistor Q4 to provide direct regenerative feedback and capacitor C3 couples the collector of transistor Q4 to the base of transistor Q3 to provide time-dependent regeneration. Bias current is normally supplied to the base of transistor Q3 from the filtered supply bus III through resistors R12 and R14.

As noted above, and as will be understood by those skilled in the art, monostable multivibrator 20 exhibits two distinct states. In each of these states one of the transistors Q3 or Q4 is conducting while the other is cut off. Because of the D.C. bias provided to the base circuit of the transistor Q3, the multivibrator 20 will normally remain in a first or stable state in which transistor Q3 is conductive. Transistor Q4 will at the same time be cut off because the conduction of transistor Q3 will bring its collector voltage to nearly ground potential and will thus remove all source of drive current to the base of transistor Q4 through resistor R11. However, multivibrator 20 can be caused, by applying a negative-going pulse of sufficient amplitude to the base of transistor Q4, to assume a second state in which the transistor Q4 is conductive. When Q4 becomes conductive, a positive-going pulse is coupled through capacitor C3 to the base of transistor Q3, thereby cutting off conduction. Transistor Q3 will remain cut off until C3 is discharged by current flowing from bus III through R12 and R14. When this current raises the potential at the base of transistor Q3 to a point at which that transistor can again conduct, multivibrator 20 will revert to the first and stable state, the capacitor C3 being recharged through resistor R8. The period for which the multivibrator 20 remains in the second state is dependent upon the parameters of R12 and C3 and may be predetermined accordingly by appropriate selection of their values.

As the emitter of transistor Q3 is connected to the base of transistor Q1, when multivibrator 20 is in its first state Q3 will conduct and transistor Q1 and the brake winding 14 will be energized. Resistor R7, which extends from the base of transistor Q1 to ground, shunts leakage currents and assures that Q1 will be turned off when Q3 is not conducting.

The emitter of transistor Q4 is similarly connected to the base of power output transistor Q2 for energization of the clutch winding 16 alternately with the brake winding 14. A turn-off resistor R6 also shunts the base-emitter circuit of the transistor Q2.

A repetitive source of pulse signals for triggering the one-shot multivibrator circuit 20 is provided by free-running multivibrator 22 including two transistors Q5 and Q6. The emitters of the transistors Q5 and Q6 are connected to the ground bus II and they are provided with appropriate collector load resistors R17 and R16 respectively. Bias current is supplied to the base of transistor Q6 via a resistor R13 which extends to the negative supply bus III and bias current is similarly supplied to the base of the transistor Q5 through resistors R14 and R15. The collector of transistor Q5 is cross-coupled, through capacitor C6, to the base of transistor Q6 and the collector of transistor Q6 is similarly cross-coupled, through capacitor C7, to the base of transistor Q5.

The free-running multivibrator circuit 22 will, when energized and not electrically disable, continuously oscillate between two states with alternate ones of the transistors Q5 and Q6 being conductive in the respective states. Pulsating currents are present at the collectors of the transistors Q5 and Q6 and, in the illustrated embodiment, the collector of transistor Q6 is coupled, through capacitor C4, to the input (base of Q4) of multivibrator 20. The collector of transistor Q6 is also shunted to the ground or common bus II through a capacitor C5 (which constitutes an essential component of delay gate 24) to obtain delay gating as explained hereinafter.

The STOP-RUN switch 26 is constituted principally by normally open switch SW1 for shunting the common junction of resistors R12, R14 and R15 to the ground bus II. For sewing machine operation, the switches SW1 and SW3 and the rheostat R5 are incorporated into a single foot control, both switches SW1 and SW3 being linked, as indicated in FIG. 2, to the arm of R5. The switches are arranged so that both are operated by the first downward movement of the foot pedal, i.e., each switch is changed to a condition opposite to that shown in FIG. 2. The rheostat R5 is arranged so that continued downward movement of the foot pedal lowers the resistance in series with the clutch winding 12. Thus, when the clutch winding 12 is energized by the transistor Q2, the rheostat R5 functions as a foot-operated speed control.

When this switch SW1 is closed, both the free-running multivibrator 22 and the one-shot multivibrator 20 are electrically disabled. Free-running multivibrator 22 is disabled because bias current is removed from the transistor Q5, the base-emitter circuit of transistor Q5 being effectively shunted by R15. The one-shot multivibrator circuit 20 is similarly disabled in that bias current is removed from the transistor Q3, the base-emitter circuit of that transistor being effectively shunted by the resistor R12.

Since transistor Q3 is rendered nonconductive by this disablement, drive current will be made available to the base of transistor Q4 through resistors R9 and R11. This transistor (Q4) will thus become conductive and multivibrator 20 will be held in its second state thereby energizing power output transistor Q2 and clutch winding 16.

As stated previously, the embodiment illustrated is particularly adapted for use with a commercial sewing machine to provide a mode of operation such that the machine will normally stop with the needle precisely positioned in a full-down location, but can be controlled to make the needle come to rest at a full-up position. The position sensor 28, which constitutes means for sensing the position of the needle, comprises a rotary commutator switch SL1, shown in FIG. 2 and operated in synchronism with the driven member. This switch SL1 may be associated with the hand wheel of the sewing machine and is operative to connect a common line 46 to a line 48 when the needle is in its down position and to a line 50 when the needle is in its up position. The line 46 is connected to the base of the transistor Q5 which is part of free-running multivibrator 22. Switch SL1 has a first conductive segment SL1D which grounds conductor 46, as will be described, when the needle is in its down position. A second similar conductive segment SL1U similarly grounds conductor 46, under certain circumstances to be described, when the needle is in its up position. It will be understood that the segments allow a small amount of tolerance from an exact positioning, say a total segment width of about 25° in each instance.

The selection of which line 48 or 50 is to be active is accomplished by a three-pole relay having a relay coil A. A pair of normally closed relay contacts A2 connects the line 48 to the common bus II and a pair of normally open relay contacts A1 connects the line 50 to the common bus II. One side of relay coil A is connected to the common bus II through a normally open switch SW2. The contacts of switch SW2 are bridged by a pair of normally open relay contacts A3 which serve to form a holding circuit as explained hereinafter. The other end of the relay coil A is connected to the ungrounded end of the energy storage capacitor C1.

As explained previously with regard to the "forcing" function, the voltage across the energy storage capacitor C1 will be about 40 volts when the clutch winding 12 is deenergized and will fall to approximately 6 volts when the clutch is energized due to the IR voltage drop in the current limiting resistance R1. The characteristics of the position-selecting relay A are chosen so that it will discriminate between these two voltage levels, i.e., the relay will pull in at about 40 volts when the clutch winding 16 is deenergized and will drop out or release when the clutch is energized and the voltage drops to approximately 6 volts.

The operation of this circuitry in performing the functions desired is as follows:

To initiate operation, the foot control is depressed, thereby closing the contacts of STOP-RUN switch SW1. The closing of switch SW1 electrically disables both the free-running multivibrator 22 and the one-shot multivibrator 20. Free-running multivibrator 22 is disabled because the resistor R15, through the switch SW1, effectively shunts the base-emitter circuit of transistor Q5. Monostable multivibrator 20 is disabled because bias or drive current is removed from the transistor Q3, the base-emitter circuit of that transistor being effectively shunted by the resistor R12 through the switch SW1. It should be noted however that, as one-shot multivibrator 20 is disabled with the transistor Q3 in a cut-off condition, bias or drive current is available to the transistor Q4 through the resistors R9 and R11 and that transistor Q4 will conduct. The conduction of transistor Q4 will turn on power output transistor Q2 and clutch winding 16 will be continuously energized. The brake winding 14 will be deenergized as Q3 and thus Q1 are cut off.

Since the switch SW3 was opened by the first downward movement of the foot pedal, the rheostat R5 will be in series with the clutch winding and can function conventionally as a speed control while the machine runs continuously under the control of the clutch alone.

To stop the apparatus with the driven member in a predetermined position (e.g., needle down), the foot pedal is released so that the contacts of switch SW3 reclose, thus effectively shunting the rheostat R5 out of the clutch winding circuit. Release of the foot pedal controlled rheostat R5 simultaneously opens switch SW1. The opening of the contacts of this STOP-RUN switch restores to operation both the free-running multivibrator 22 and the one-shot multivibrator 20. Bias current is provided, through the resistor R14, to the base circuits of transistor Q5 and Q3, respectively.

With bias current available to the transistor Q3, the one-shot multivibrator 20 reverts to its normal or first state, i.e., with the transistor Q3 conducting and with the transistor Q4 cut off. Accordingly the brake winding 14 will be energized by transistor Q1 and the clutch winding 16 will be deenergized by transistor Q2. Since the energy storage capacitor C2 will have previously been charged to a relatively high voltage, the brake winding 14 will be subjected to a surge of current which will "force" the initial braking function and very quickly decrease the speed of the driven shaft to a value within the response time of the positioning control circuitry.

The enablement of the free-running multivibrator 22 will permit that circuit to begin oscillation in a flip-flop mode, that is with the transistors Q5 and Q6 alternating in conduction. Although the free-running multivibrator 22 will begin to oscillate immediately upon enablement, pulses from the collector circuit of transistor Q6 will not immediately begin to trigger the one-shot multivibrator circuit 20 through capacitor C4 due to the operation of capacitor C5 which functions as a delay gate means.

Prior to the enablement of the free-running multivibrator 22, the capacitor C5 will be nearly completely discharged due to the relatively long period of saturation or conduction of transistor Q6. When the free-running multivibrator 22 is thereafter enabled by the opening of switch SW1, the capacitor C5 will begin to charge through resistor R16. However, while capacitor C5 is initially charging, the initial oscillations of the free-running multivibrator 22 will not induce a sufficient time-rate-of-change of voltage across capacitor C4 to overcome the switching threshold of the one-shot multivibrator circuit 20.

The switching threshold at the base of transistor Q4 is determined largely by the emitter-base barrier voltage of that transistor, and the emitter degeneration caused by emitter resistor R6 and the base-emitter circuit of transistor Q2. After C5 is charged, the free-running multivibrator 22 can induce a pulse at the base of transistor Q4 sufficient to trigger the one-shot multivibrator 20.

In constructing the circuit, the time constant of capacitor C4 and resistor R10 is chosen so that the free-running multivibrator circuit can induce a pulse of sufficient strength to trigger the one-shot multivibrator circuit 20. Then the value of capacitor C5 is chosen in view of these parameters and the value of resistor R16 to provide a desired delay interval after enablement.

During the delay interval provided by the capacitor C5, brake winding 14 is energized by the one-shot multivibrator 20 which remains in its first or stable state with the transistor Q3 conducting. During this delay interval, the brake winding is subjected to the initial surge of current from the energy storage capacitor C2 as discussed previously and this surge "forces" or speeds the braking of the machine so that it is quickly brought to a decreased speed which is within the response time of the positioning circuitry.

At the end of the delay interval, determined by the capacitor C5 becoming sufficiently charged, astable multivibrator 22 will repetitively trigger monostable multivibrator 20 with pulses coupled through the capacitor C4. At each triggering impulse the one-shot multivibrator will assume its second state, that is with the transistor Q4 in conduction, for the characteristic period determined by the relative values of capacitor C3 and resistor R12 and will then revert to its first or stable state. Due to the repeated triggering, the one-shot multivibrator 20 will repetitively alternate between its two states and, correspondingly, current will be alternately applied to the brake winding 14 and clutch winding 16. The relative length of time spent in each state is determined by the relation between the period of the one-shot multivibrator 20 and the frequency of oscillation of the free-running multivibrator 22. For a typical commercial sewing machine, the circuit parameters were chosen so that the clutch is energized for 10 milliseconds and then the brake is energized for 15 milliseconds. To provide this timing, the oscillations of the free-running multivibrator 22 have a period of 25 milliseconds and the characteristic period of the one-shot multivibrator in its second state is 10 milliseconds. Thus the application of rapidly pulsed electric power to the brake and clutch control windings causes the driven member to operate at a reduced speed from which a complete precise stop can be reliably and easily made. It will be noted that, since the output transistors Q1 and Q2 operate as switches rather than as amplitude modulation devices, virtually no power is dissipated in the transistors themselves.

The driven member continues to rotate at this reduced speed until the position sensor switch segment SL1D closes the circuit between lines 46 and 48 thus indicating that the needle has reached its down position. The base of transistor Q5 will thereby be grounded or connected to the common bus II through switch SL1 and normally closed relay contacts A2. This electrically disables free-running multivibrator 22 by directly shunting the base-emitter circuit of the transistor Q5. The disablement of multivibrator 22 will stop the triggering of the one-shot multivibrator circuit 20 so that it will revert to and remain in its first or stable state. In this state the transistor Q3 is conductive and the transistor Q1 and the brake winding 14 are energized. As the brake winding 14 was only intermittently pulsed or energized just previously, the energy storage capacitor C2 will be charged to a potential at least somewhat above its normal voltage, and this energization of the brake winding 14 will again cause it to be subjected to a "forcing" surge of current from the energy storage capacitor C2. Since the reversion of the one-shot multivibrator circuit 20 to its first state deenergizes the clutch winding 16 as well as energizing the brake winding 14, the driven member and thus the sewing machine needle will be quickly brought to a complete stop with the needle in its down position.

To position the sewing machine with its needle in an up or raised position, switch SW2 is operated while foot control rheostat R5 is not depressed and switch SW3 is in its closed position as shown in FIG. 2. Closing the switch SW2 energizes the relay coil A since the clutch winding 16 is deenergized and the capacitor C1 is charged to a relatively high voltage. The pulling in of the relay sets up a holding circuit through the normally open contacts A3 which are in parallel with the switch SW2. Simultaneously, the normally closed contacts A2 open so as to disconnect the line 48 from the common bus II while the normally open contacts A1 close to connect the line 50 to the common bus II. Accordingly, segment SL1U of position-sensing switch SL1 becomes operative to sense the needle up position of the driven member. Since prior to the actuation of the switch SW2 the sewing machine will have stopped in the needle down position, the switch SL1 will be open with respect to the line 50 and the disablement of free-running multivibrator 22 will be discontinued. Multivibrator 22 will thus begin to oscillate and, after the delay interval imposed by capacitor C5, it will begin to trigger the one-shot multivibrator 20. The repetitive triggering of multivibrator 20 will produce alternate and repetitive energization of the brake and clutch windings as in the positioning operation described previously. The driven member of the sewing machine will thus advance at a controllable reduced speed. The intermittent energization of the clutch winding 16 which occurs during the reduced speed operation of the machine does not completely discharge the energy storage capacitor C1 to such a low voltage that the relay coil A drops out.

When the sewing machine reaches the up needle position, the free-running multivibrator 22 will be disabled by the connection of the base of transistor Q5 to the common bus II through segment SL1U of switch SL1 and the relay contact A1. The disablement of the free-running multivibrator 22 will stop the triggering of the one-shot multivibrator 20 which will then revert to its first or stable state thereby energizing the brake and deenergizing the clutch. The sewing machine will thus be brought to a rapid stop with the needle in its raised position.

The clutch winding 16 will remain deenergized while the machine is stopped in the needle up position and accordingly there will be a sufficient voltage across the capacitor C1 to maintain the holding circuit which keeps the relay coil A energized. Thus the needle up position is a stable state and the machine will not immediately thereafter revert to a needle down position. However, once the machine operation is again initiated by depressing the foot control and closing switch SW1 to energize clutch winding 16, the voltage across the capacitor C1 will be substantially reduced and the relay will drop out, breaking the holding circuit. Accordingly, the next time the machine is stopped, it will position with the needle down, which is the most frequently desired position.

If switch SW2 is closed while the machine is running, the energy storage capacitor C1 will be discharged so that the relay will not be energized to set up the holding circuit. If, however, the pedal control is then released to open the STOP-RUN switch SW1, the machine will first position in the needle down condition. The holding circuit will then be established and the machine will immediately reposition the needle to its raised or up position. However, this sequence of operations occurs so rapidly that the eye will not follow the various changes, and it appears that the machine has actually positioned up without first having stopped in the down position.

It will be understood by those skilled in the art that predetermined positions, other than two opposite ones, and more than two predetermined positions may be provided in accordance with this invention simply by providing additional contact and switching functions to relay A and switch SW2 with a commensurate increase of conductive segments in the position-sensing switch SL1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for stopping, at a predetermined position, a rotatable member driven by a driving member through an electric clutch and braked by an electric brake; said control comprising:
    means for actuating said clutch to rotate said driven member;
    means for actuating said brake to brake rotation of said driven member;
    a circuit including a switch having a first position in which the circuit energizes the clutch actuating means thereby to rotate said driven member at a desired speed, said switch having a second position in which the brake actuating means is energized by said circuit to brake the driven member, said circuit further including means to deenergize the brake actuating means after a predetermined time interval and means operative after said interval for alternately and repetitively energizing said brake and clutch actuating means thereby to rotate said driven member at a reduced speed;
    and means connected in said circuit for sensing a predetermined position of said driven member and energizing said brake actuating means whereby the driven member is brought to a stop at said predetermined position.

2. A control as set forth in claim 1 in which said position sensing means includes means for sensing a second predetermined position of said driven member and energizing said brake actuating means, and said circuit further includes a selector switch having first and second positions and interconnected with said position sensing means whereby in the first selector switch position the circuit will energize the brake actuating means to stop said driven member at the first predetermined position and in the second selector switch position the circuit will energize the brake actuating means to stop said driven member in the second predetermined position.

3. A control as set forth in claim 1 in which said clutch and brake actuating means comprise semiconductor current switching devices.

4. A control as set forth in claim 3 in which said circuit includes a monostable multivibrator having a first and stable state in which it energizes said brake actuating means and a second state in which it energizes said clutch actuating means.

5. A control as set forth in claim 4 in which said circuit includes means interconnecting said switch and said monostable multivibrator whereby when said switch is in its first position the monostable multivibrator is electrically disabled to maintain it in its second state.

6. A control as set forth in claim 4 wherein said means for alternately and repetitively energizing said clutch and brake energizing means includes an astable multivibrator for supplying a series of trigger signals to said monostable multivibrator to repetitively switch it between its second and first states.

7. A control as set forth in claim 6 wherein said means to deenergize the brake actuating means after a predetermined time includes a delay gate having a capacitor which delays the application of the trigger signals to said monostable multivibrator until the switching threshold of said monostable multivibrator is exceeded.

8. A control as set forth in claim 7 wherein said position sensing and brake energizing means includes a commutator switch operating in synchronism with said driven member and having a conductive segment for completing a circuit to disable said astable multivibrator when the driven member is in said predetermined position whereby the monostable multivibrator reverts to its first and stable state thereby energizing the brake actuating means.

9. A control as set forth in claim 1 which further includes an energy storage circuit interconnected with the brake actuating means to provide an initial forcing surge of current therethrough thereby to accelerate the braking action of said brake.

10. A control as set forth in claim 2 which further includes an energy storage circuit interconnected with the clutch actuating means to provide an initial forcing surge of current therethrough to accelerate the rotation of said driven member.

11. A control as set forth in claim 10 which further includes a relay having a coil connected with the clutch energy storing circuit and the selector switch, said relay being energizable only when said selector switch is in its second position and said energy storage circuit is substantially charged, said relay having a set of contacts connected in said circuit to energize the brake actuating means when said relay coil is energized thereby to stop said driven member in said second predetermined position.

12. A control as set forth in claim 11 in which said relay includes a holding circuit which opens in response to energization of said clutch actuating means.

13. A control for stopping, at a predetermined position, a rotatable member driven by a driving member through an electric clutch and braked by an electric brake; said brake and clutch each having a control winding; said control comprising:
- a first semiconductor switching device connected to the clutch winding to actuate said clutch to rotate said driven member;
- a second semiconductor switching device connected to the brake winding to actuate said brake to brake rotation of said driven member;
- a circuit including:
  - a switch having first and second positions,
  - a monostable multivibrator having a first and stable state in which it causes the second switching device to conduct and a second state in which it causes said first switching device to conduct, said multivibrator having an input responsive to a trigger signal to change from its first state of operation to its second state and to revert to its first state after a preselected period of time,
- means interconnecting said switch and said multivibrator for electrically disabling said multivibrator to maintain it in its second state when said switch is in its first position thereby to actuate said clutch and rotate the driven member at a desired speed,
- an astable multivibrator for generating a series of trigger signals,
- and a delay gate interconnecting the astable multivibrator to the monostable multivibrator, said gate including a capacitor which delays application of said trigger signals to said monostable multivibrator input for a predetermined time interval,
- said circuit being responsive upon movement of said switch from its first to its second position to enable the monostable multivibrator to revert from its second to its first state thereby to energize said brake winding to initiate braking of said driven shaft and simultaneously to energize the astable multivibrator whereby after said predetermined time interval said monostable multivibrator has a trigger signal applied to its input thereby causing it to deenergize the brake and thereafter alternately and repetitively energize the second and first switching devices to conduct and alternately and repetitively actuate said brake and clutch thereby to rotate said driven member at a reduced speed,
- and means connected in said circuit for sensing a predetermined position of said driven member and electrically disabling said astable multivibrator when the driven member is in its predetermined position whereby the monostable multivibrator reverts to its first and stable state thereby causing the second switching device to conduct and energize said brake to bring the driven member to a stop at said predetermined position.

14. A control as set forth in claim 13 in which said position sensing means includes means for sensing a second predetermined position of said driven member and electrically disabling the astable multivibrator when the driven member is in its second predetermined position thereby to permit said monostable multivibrator to revert to and maintain its first state and actuate said brake, and said circuit further includes a selector switch having first and second positions and interconnected with said position sensing means whereby in the first selector switch position the circuit will actuate the brake to stop said driven member at the first predetermined position and in the second selector switch position the circuit will actuate the brake to stop said driven member in the second predetermined position.

15. A control as set forth in claim 14 which further includes an energy storage circuit having a capacitor interconnected with the second switching device and the brake winding to provide an initial forcing surge of current therethrough thereby to accelerate the braking action of said brake.

16. A control as set forth in claim 15 which further includes an energy storage circuit having a capacitor interconnected with the first switching device and the brake winding to provide an initial forcing surge of current therethrough to accelerate the rotation of said driven member.

17. A control as set forth in claim 16 which further includes a relay having a coil connected with the clutch energy storing circuit and the selector switch, said relay being energizable only when said selector switch is in its second position and the clutch energy storage circuit capacitor is substantially charged, said relay having a set of contacts connected in the first said circuit to energize the brake when said relay coil is energized thereby to stop said driven member in said second predetermined position.

18. A control as set forth in claim 17 in which said relay includes a holding circuit which opens in response to the discharging of said clutch capacitor by energization of said clutch winding.

References Cited by the Examiner
UNITED STATES PATENTS
3,160,128  2/1964  Heidt _____ 112—219

FRANK SUSKO, *Primary Examiner.*

DON A. WAITE, *Examiner.*

A. T. McKEON, *Assistant Examiner.*